United States Patent [19]
Yamagami et al.

[11] Patent Number: 5,297,125
[45] Date of Patent: Mar. 22, 1994

[54] OPTICAL RECORDING MEDIUM AND INFORMATION RECORDING APPARATUS FOR RECORDING BURSTS OF LOW-PASS FILTERED REPRODUCE-ONLY INFORMATION IN A WOBBLING PRE-GROOVE ON THE OPTICAL RECORDING MEDIUM

[75] Inventors: Tamotsu Yamagami, Kanagawa; Yoichiro Sako, Chiba, both of Japan

[73] Assignee: Sony Corporation, Tokyo, Japan

[21] Appl. No.: 951,021

[22] Filed: Oct. 13, 1992

Related U.S. Application Data

[63] Continuation of Ser. No. 674,344, Apr. 22, 1991, abandoned.

[30] Foreign Application Priority Data

Aug. 25, 1989 [JP] Japan ................... 1-219411

[51] Int. Cl.$^5$ ............................................... G11B 7/00
[52] U.S. Cl. ................................. 369/44.13; 369/44.26
[58] Field of Search ............... 369/59, 275.1, 275.3, 369/275.4, 277, 278, 279, 44.26, 44.13

[56] References Cited

U.S. PATENT DOCUMENTS

| 4,907,216 | 3/1990 | Rijnsburger | 369/275.1 |
| 4,942,565 | 7/1990 | Lagadec | 369/59 |
| 5,077,721 | 12/1991 | Sako et al. | 369/59 |

FOREIGN PATENT DOCUMENTS

| 032271A1 | 7/1981 | European Pat. Off. | G11B 7/00 |
| 0325330A1 | 7/1989 | European Pat. Off. | G11B 27/30 |
| 0347858 | 12/1989 | European Pat. Off. | 369/275.4 |
| 56-163534 | 12/1981 | Japan | 369/275.4 |
| 60-247842 | 12/1985 | Japan | 369/279 |
| 61-236046 | 10/1986 | Japan . | |
| 62-043839 | 2/1987 | Japan | 369/275.4 |
| 62-089253 | 4/1987 | Japan | 369/275.4 |
| 01296443 | 11/1989 | Japan | 369/275.4 |
| 2022875A | 12/1979 | United Kingdom | G11B 7/00 |

*Primary Examiner*—Aristotelis Psitos
*Assistant Examiner*—P. W. Huber
*Attorney, Agent, or Firm*—Philip M. Shaw, Jr.

[57] ABSTRACT

The present invention is concerned with a recording medium wherein, in a recording medium in which the information may be regenerated optically, a track is pre-recorded or pre-formatted by being deviated along the track width with a signal which the baseband signal of a read-only information signal freed of high-frequency components. The present invention is also concerned with a recording apparatus for forming a track of an optical recording medium from which an information can be reproduced optically, wherein the apparatus includes a deviating device for deviating a track-forming recording beam along the width of the track of the optical recording medium, a deviation control signal generating device for generating deviation control baseband signals for controlling the deviation device, and a low-pass filter for eliminating the high-frequency components of the deviation control baseband signals.

3 Claims, 4 Drawing Sheets

OPTICAL RECORDING MEDIUM AND INFORMATION RECORDING APPARATUS FOR RECORDING BURSTS OF LOW-PASS FILTERED REPRODUCE-ONLY INFORMATION IN A WOBBLING PRE-GROOVE ON THE OPTICAL RECORDING MEDIUM

This is a continuation of co-pending application Ser. No. 07/674,344, filed on Apr. 22, 1991, now abandoned.

TECHNICAL FIELD

This invention relates to an optical recording medium adapted for optically reproducing the information, and an information recording apparatus for prerecording a track on the recording medium. More particularly, it related to an optical recording medium and an information recording apparatus wherein the information, such as sync signals, have been recorded by offsetting along track width.

BACKGROUND ART

In an optical recording medium, such as a magneto-optical disc, it is known to provide a spiral guide groove or concentric guide grooves in advance on a disc and to record and/or reproduce data by taking advantage of the magneto-optical effects with the use of the pre-formed groove or grooves or the land between the adjoining grooves as the recording track or tracks. In general, addresses and data are recorded alternately on the recording track and data supervision is performed on the basis of the address information. With the aid of the address information, data may be recorded and/or reproduced on a block-by-block or sector-by-sector basis.

There is disclosed in the Japanese Patent Kokai Publication No. 63-8768 (1988) a technique in which a wobbling track for detecting the tracking error is recorded by frequency modulation by the timing code. With this technique, a 22.05 kHz sinusoidal carrier signal is frequency modulated on the basis of a timing code signal having a frequency much lower than that of the carrier to produce a wobbling track to obtain a tracking error signal during reproduction, with the timing code being demodulated to produce the position information. However, the volume of the recordable information is small and, when the technique is used for data storage, the optical head cannot be positioned accurately.

On the other hand, there is disclosed in the specification and drawings of the Japanese Patent Application 1-41784 (1989) a technique in which, as shown in FIG. a track 75 is offset in the direction of the track width on the basis of a baseband signal of read-only information, such as the data block address, and in which, during reproduction, the address is obtained with the aid of a so-called push-pull signal from a photodetector divided into two segments along the track direction. That is, by taking advantage of the fact that reproduction of the magneto-optical data signal 77 recorded on the track per se is not affected by the signal obtained by track offsetting, and that the address or the like information is contained in the high frequency range of the push-pull signal, while the tracking error signal is contained in the low frequency range, with these signals having different band widths, the address or the like information may be reproduced and, on the basis of the reproduced information, data may be supervised on a block-by-block basis.

As a principle, the magneto-optical signal (Mo signal) 77 recorded on the track 75 per se is not affected by the signal recorded by offsetting the track 75. However, in effect, the high-frequency components, for example, tend to leak into and affect the reproduced signals (RF) 79 of the MO signal 77 due to fluctuations in detector sensitivity and to the presence of the edge 78 of changes in the width of the track 75. It has also been shown that the more acute the edge, the more difficult it becomes to cut the groove or produce the optical disc by a stamper, The present invention has been made with the above state of the art in mind. It is an object of the present invention to provide an optical recording medium in which the effect which the signal prerecorded by offsetting the track along its width has on the main signal recorded on the track may be diminished, and an information recording apparatus for prerecording the track on the recording medium.

DISCLOSURE OF THE INVENTION

The present invention provides an optical recording medium for reading out recorded information by optical means, wherein reproduce-only information is previously recorded by offsetting the track in the direction of its width in accordance with a signal which is a baseband signal of the reproduce-only information freed of high-frequency components.

The present invention also provides an information recording apparatus for forming a track on an optical recording medium from which recorded information is read out by optical means. The apparatus comprises deviating means for deviating a recording beam in the direction of the width of the track on said optical recording medium, deviation control signal generating means for generating deviation control signals controlling said deviating means, and a low-pass filter for removing any high-frequency components of said deviation control signals and supplying the resulting signal to said deviating means.

With the optical recording medium of the present invention, since the track is recorded by offsetting the track along the track width by a baseband signal of the deviation control signal freed of high-frequency components, the offset track edge along track width is smoothed, so that the adverse effects which the signal component by the offset along the track width has on the reproduced signal of, for example, the MO signal on the track, may be effectively prevented during reproduction from the recording medium.

With the information recording apparatus of the present invention, the edge of the track is formed as a smooth edge at the time of recording the offsets along the track width.

BEST EMBODIMENT FOR PRACTICING THE INVENTION

Figure 1:
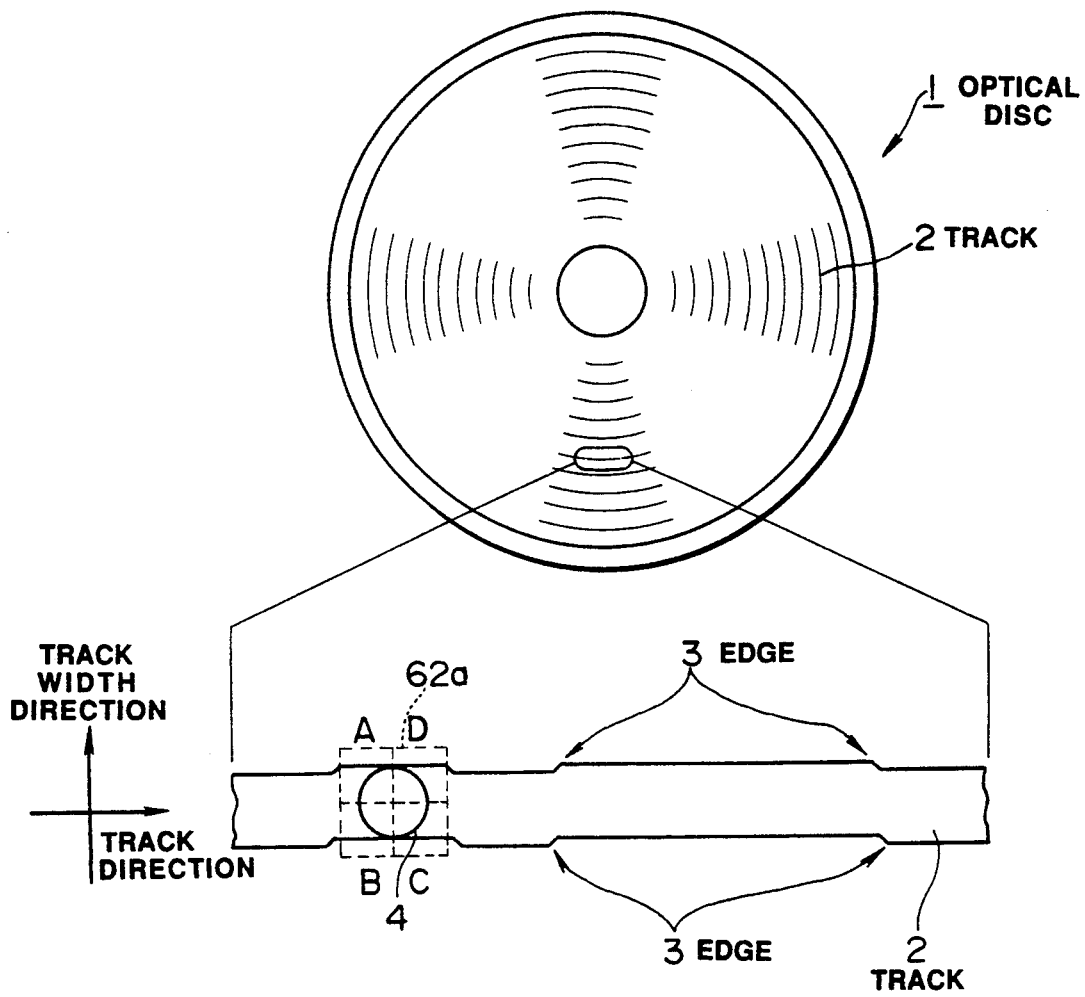
FIG. 1 is a diagrammatic plan view showing a track on an optical disc as an embodiment of the optical recording medium according to the present invention.

An embodiment of the present invention will be hereinafter explained by referring to the drawings.

In FIG. 1, in which an optical disc embodying an optical recording medium according to the present invention is shown diagrammatically in its entirety and only partially to an enlarged scale, an optical disc 1 is a magneto-optical disc having, for example, magneto-optical effects, as a recording medium, and includes a pregroove formed in for example, a spiral pattern. Magneto-optical signals (MO signals) 4 may be recorded on a recording track 2, provided by the pregroove, along the direction of the track.

Figures 2, 3:
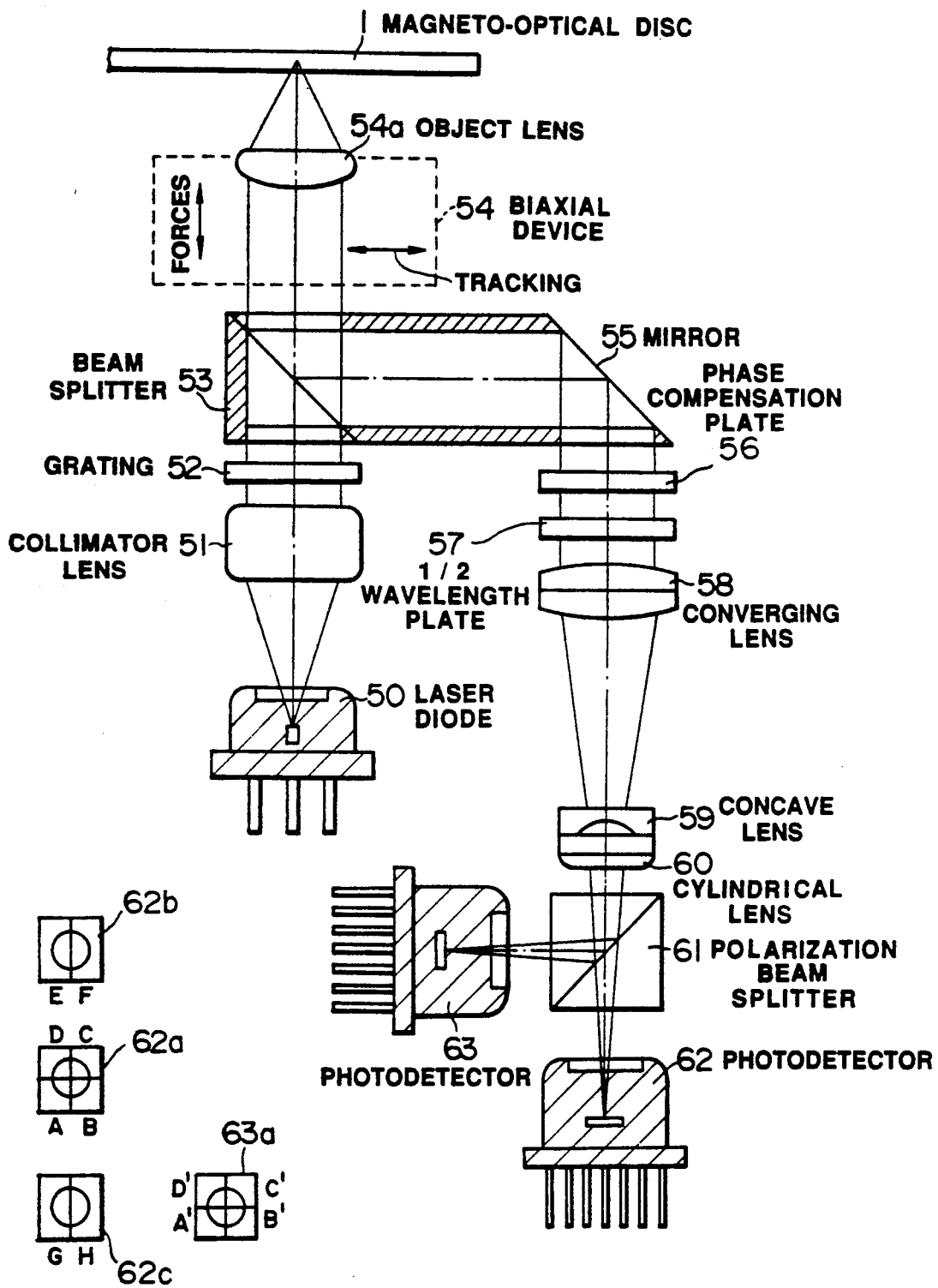
FIG. 2 shows the construction of a pickup for a magneto-optical disc.
FIG. 3 shows the construction of a photodetector.

In order to record read-only information such as data block address information or sync signals of the CD-ROM format, hereinafter referred to as "recording information," the track 2 or the pregroove is deviated or offset along its width by the baseband signal, freed of high frequency components, of the read-only information. That is, the track 2 is modulated by the baseband signal of the recording information, and has a smooth edge 3. Referring now to FIG. 2, a pickup for a magneto-optical disc for reproducing the above described magneto-optical disc is hereinafter explained.

In FIG. 2, a laser beam from a laser diode 50 is collimated by a collimator lens 51 to fall on a grating (diffraction lattice) 52. By this grating 52, the laser beam is divided into three spots for forming a main spot and both side spots on the medium, before falling on the magneto-optical disc 1 by means of a beam splitter 53 and on object lens 54a of a biaxial device 54 adapted for focusing and tracking. The laser beam reflected back from the magneto-optical disc 1 is incident on a mirror 55 by means of a beam splitter 53 and deflected in its direction by 90° before falling on a polarization beam splitter 61 by means of a phase compensation plate 56, a ¼ wavelength plate 57, a converging lens 58, a concave lens 59 and a cylindrical lens 60. The polarization beam splitter 61 splits the laser beam into a P polarized light (the polarized light parallel to the plane of incidence) and an S polarized light (the polarized light perpendicular to the plane of incidence), which then fall on photodetectors 62 and 63 adapted for detecting the tracking error signal, focusing error signal and magneto-optical signals (MO signals).

Referring to FIG. 3, the photodetector 62 is made up of a light detecting device 62a, divided into four light receiving sections A, B, C and D, a light detecting device 62b, divided into two light receiving sections E and F, and a light detecting device 62c, divided into two light receiving sections G and H. The photodetector 63 is constituted by a light detecting device 63a divided into four light receiving sections A', B', C' and D'. The outputs from these light receiving sections are herein termed $S_A$, $S_B$, $S_C$, $S_D$, $S_E$, $S_F$, $S_G$, $S_H$, $S_A'$, $S_B'$, $S_C'$ and $S_D'$.

These photodetectors 62 and 63 detect the laser beam irradiated on and reflected back from the magneto-optical disc 1. Thus the photodetectors detect three light spots of the three beams by photodetector 62 and, from the outputs of the light receiving sections A to H, calculate the tracking error signal TE or $$TE = [(S_A - S_D) - S_B + S_C)] - K_X[(S_E - S_F) + (S_G - S_H)]$$

by the so-called differential push-pull method to effect tracking. As regards a focusing error signal FE, the photodetectors calculate the signal FE or $$FE = (S_A - S_C) - (S_B + S_D)$$

from the detection output of the main spot among the three spots (the spot 4 in FIG. 1) by the so-called astigmatic method to effect focusing. As regards the magneto-optical signal MO, the photodetectors calculate the signal MO or $$MO = (S_A + S_B + S_C + S_D) - (S_A' + S_B' + S_C' + S_D') \quad (1)$$

on the basis of outputs from the photodetectors 62 and 63.

Figure 4:
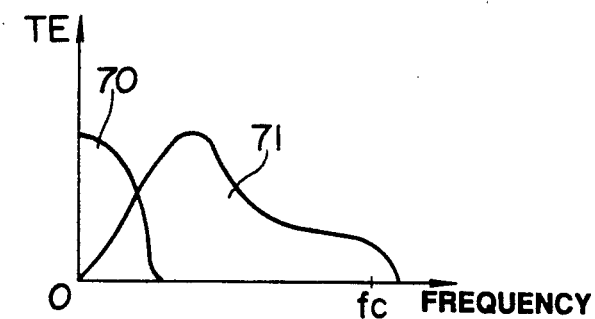
FIG. 4 is a diagram showing frequency characteristics of the tracking error signal.

Meanwhile, the reproduced signal of the information recorded by offsetting the track along its width is detected as the high frequency component of the above mentioned tracking error signal TE. That is, as shown in FIG. 4, a low-frequency component 70 of the tracking error signal TE is used for tracking per se, whereas a high frequency component 71 thereof is used for reproducing the signal prerecorded by offsetting the track along its width (by high speed groove modulation).

The effect of the high-speed groove modulation on the magneto-optical signals (MO signals) that is, level changes caused by track offsetting act as in-phase components on the first and second terms of the equation (1) and hence cancel each other, so that, as a principle such level changes are not produced. However, as mentioned previously, the track edge may cause the high frequency component of the edge to be leaked into the MO signal so as to cause the level to be lowered. Therefore, by smoothing the edge, as explained previously it becomes possible to reduce the effects, caused by track offsetting.

Figure 5:
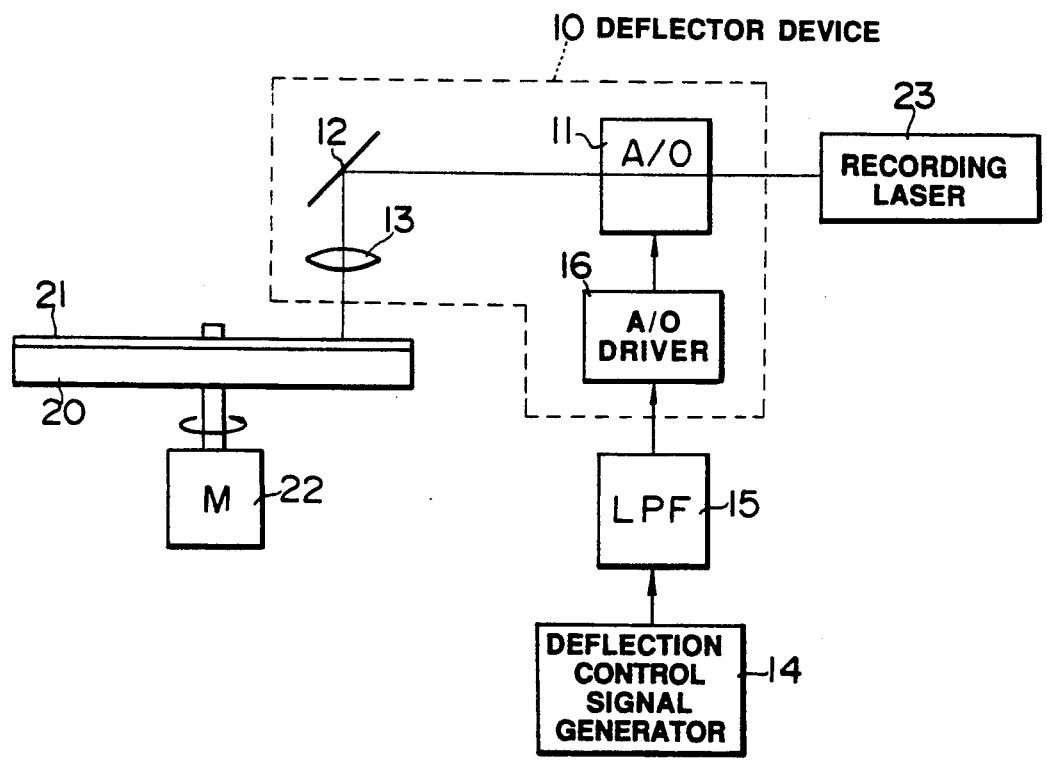
FIG. 5 is a block diagram showing an embodiment of the information recording apparatus according to the present invention.
Figure 6A:
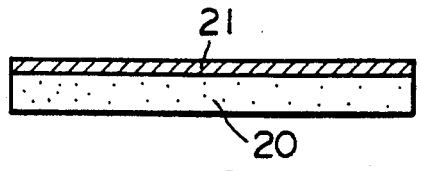
FIGS. 6(a-f) shows various components in an example of the process for producing an optical disc in cross-section.
Figure 6B:
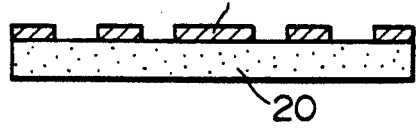
Figure 6C:
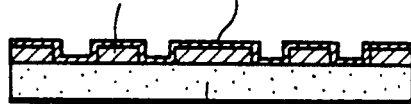
Figure 6E:
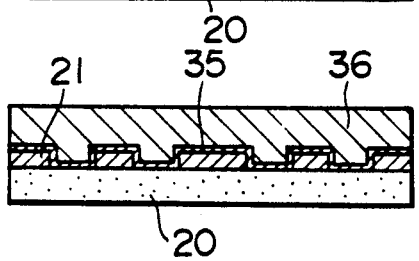
Figure 6F:
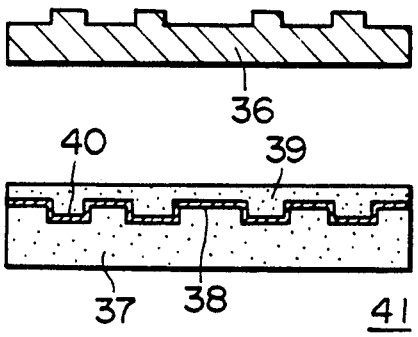
Figures 6D, 7:
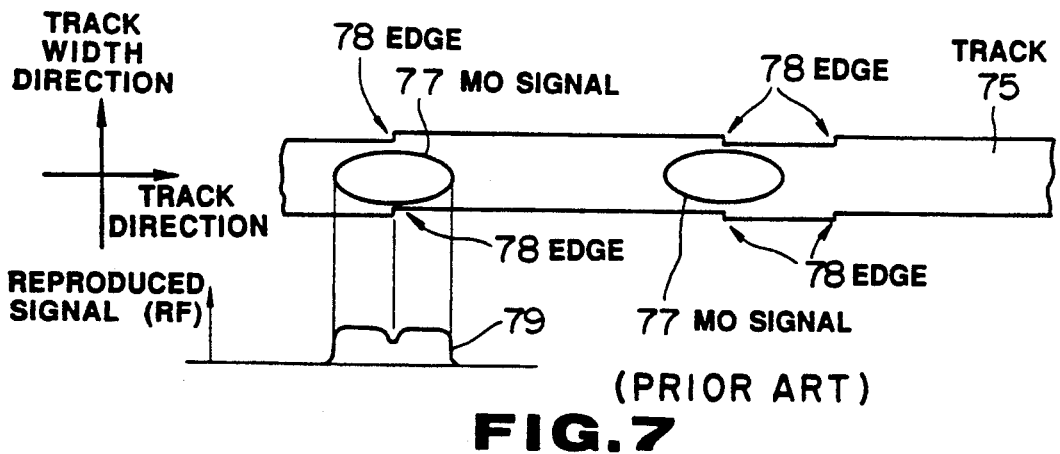
FIG. 7 is a diagrammatic plan view showing a track on a conventional optical disc.

An embodiment of a recording apparatus for forming the pre-groove on the optical disc is shown in FIG. 5. In this figure, a photoresist 21 is coated on the surface of a glass disc 20 which is rotated at, for example, a constant linear velocity by a spindle motor 22. The laser beam from a recording laser 23 is deflected by an acoustic/optical effect optical converter (A/0) 11 of a deflecting unit 10 and reflected by a mirror 12 so as to be irradiated on the photoresist 21 by means of an object lens 13.

The baseband signal of the recording information from a deflection control signal generator 14 is supplied to a low-pass filter (LPF) 15 where it is freed of the high-frequency component. The signal thus freed of the high frequency component is supplied to an A/0 driver 16 where the laser beam is deviated at the A/0 11 along the track width (in the radial direction).

In this manner, a pattern corresponding to a spirally extending pregroove offset along the track width, referred to hereinafter as a pre-groove pattern, is formed on the photoresist 21 by exposure by the laser beam. Thus the exposed pregroove pattern is offset along the track width, in keeping with the recording information, with the edge of the pregroove pattern being smoothed due to elimination of the high frequency component of the baseband signal of the recording information, as explained in the foregoing. In other words, by forming the pregroove by modulation thereof with the baseband signal of the recording information freed of the high frequency component (high-speed groove modulation), the track 2 has an offset along the track width, in keeping with the recording information, with the edge 3 of the track 2 being smooth.

Meanwhile, if an extremely small value of the cut-off frequency fc of the LPF 15 f or smoothing the edge as shown in FIG. 5 is used, it becomes difficult to detect the s i 9 n a l recorded by the high speed groove modulation. Conversely, if a larger value of the cut-off frequency is used, the MO signal tends to be affected. Thus the cut-off frequency fc of the LPF 15 is determined in relation with the frequency range of the reproducing optical system. For example, with the cut-off frequency of the reproducing optical system of 1.4 MHz, the cut-off frequency Ec of the LPF 15 is preferably set to about 1.2 MHz. It i s noted that the deflection unit 10 is capable of deflecting the beam to follow input control signals up to, for example, 5 to 6 MHz, so that the effect of introducing the LPF 15 is significant, as mentioned previously.

FIG. 6 shows the production process for the optical disc. FIG. 6a shows a glass master which has been cut optically as described above (or on which the pregroove pattern has been formed by exposure by the laser beam). on developing the glass master, recesses in register with the pregrooves are formed, as shown in FIG. 6b. Then, aluminum 35 is evaporated on the photoresist 21 as shown in FIG. 6c, and a nickel plating 36 is applied as shown in FIG. 6d. The nickel plating 36 is then peeled off, as shown in FIG. 6e, to produce a metal master. A stamper is prepared from the metal master and an optical disc 41 shown in FIG. 6f is produced through the steps of injection molding by the stamper, formation of a recording layer and addition of a protective film. This optical disc 41 is provided with a polycarbonate substrate 37, a recording layer 38 and a transparent protective film 39. A pregroove 40 is formed in the recording layer 38. If necessary, the optical disc 41 may be of a bonded structure to enable double-side recording with a write-once (WORM) type optical disc, the recording layer 38 is formed of such materials as sbse or BiTe, whereas, with an erasable optical disc, such as a magneto-optical disc, it is formed of such material as TbFeCo.

Meanwhile, if the pregroove edge is smoothed, as mentioned above, cutting of the master disc or duplication of the optical disc by the above mentioned stamper may be facilitated.

It will be seen from the above description that, with the recording medium of the present invention, when pre-recording the time of recording the offsets along the track width by offsetting the track along the track width, the pregroove is formed by offsetting or modulating the track along its width by the baseband signal of the recording information freed of the higher frequency component, in such a manner that the signal recorded by offsetting the track along its width may be effectively prevented from leaking into main signals (such as magneto-optical signals) recorded on the track during reproduction from the magneto-optical disc, so that the magneto-optical signals and for example, the sync signals as well as the address information may be multiplexedly written in the same area.

With the recording apparatus of the present invention, by eliminating the high frequency components of the baseband signal of the record in g information by a low-pass filter and deflecting the recording laser beam along the track width by using the above signal, a track with a smooth edge may be obtained to produce the recording medium, such as the above mentioned magneto-optical disc. In addition, by smoothing the edge of the thus formed pre-groove, master disc cutting and disc duplication by the stamper may be facilitated.

What is claimed is:

1. An information recording apparatus for forming a track on an optical recording medium from which recorded information is read out by optical means, said apparatus comprising deviating means for deviating a recording beam, for forming said track, along the width of the track on said optical recording medium, deviation control signal generating means, supplied with address information from an external source, for generating corresponding deviation control signals for controlling said deviating means, and a low-pass filter for removing high-frequency components of the deviation control signals and supplying a resulting signal to the deviating means, wherein the low-pass filter has a cut-off frequency of about 1.2 MHz.

2. An information recording apparatus for forming a track on an optical recording medium from which recorded information is read out through optical means having a high cut-off frequency of at least 1.4 MHz. so that frequencies of the read out recorded information above 1.4 MHz. are cut of, said apparatus comprising deviating means for deviating a recording beam, for forming said track, along the width of the track on said optical recording medium, deviation control signal generating means for generating deviation control baseband signals controlling said deviating means, and a low-pass filter for removing high-frequency components of said deviation control baseband signals and supplying a resulting signal to said deviating means, the low-pass filter having a cut-off frequency which is a predetermined percentage of the high cut-off frequency of the optical means.

3. An information recording apparatus as recited in claim 2, wherein the low-pass filter has a cut-off frequency of about 1.2 MHz.

* * * * *